Jan. 5, 1965 R. A. HEINZEN 3,164,734
SYNCHRONOUS MOTOR WITH NOTCHED POLE
PIECES TO FACILITATE STARTING
Filed Aug. 2, 1961

INVENTOR.
ROBERT A. HEINZEN
BY
Wheeler, Wheeler + Wheeler.
ATTORNEYS

United States Patent Office 3,164,734
Patented Jan. 5, 1965

3,164,734
SYNCHRONOUS MOTOR WITH NOTCHED POLE PIECES TO FACILITATE STARTING
Robert A. Heinzen, Manitowoc, Wis., assignor to American Machine & Foundry Company, a corporation of New Jersey
Filed Aug. 2, 1961, Ser. No. 128,831
2 Claims. (Cl. 310—156)

This invention relates to a synchronous motor having a single set of notched tipped digital pole projections and a floating rotor.

In the copending application Serial No. 103,069, filed April 14, 1961, there is described a synchronous motor with special respect to the establishment of a flux path including not only a single set of digital pole pieces and a permanent magnet rotor, but also the cover or part of the case in which the synchronous motor is mounted or installed. In such a motor, the case had such relationship to the rotor as to magnetically set up a thrust axially of the rotor shaft. Furthermore, because of the single pole structure embodiment with a single set of digital pole projections, the starting characteristics of the motor while superior in many respects have now been improved. The instant invention so arranges the coil, single set of digital pole projections, permanent magnet rotor and magnetically permeable portion of the cover or case of the motor that axial thrust upon the rotor shaft is minimized; the rotor floats without substantial magnetically induced thrust; and because of the novelly shaped digital pole projections in their relation to the permanent magnet rotor and the particular flux path which I have now provided, the rotor can be relied upon to start. This is true even under adverse conditions of friction or load.

Figure 2:
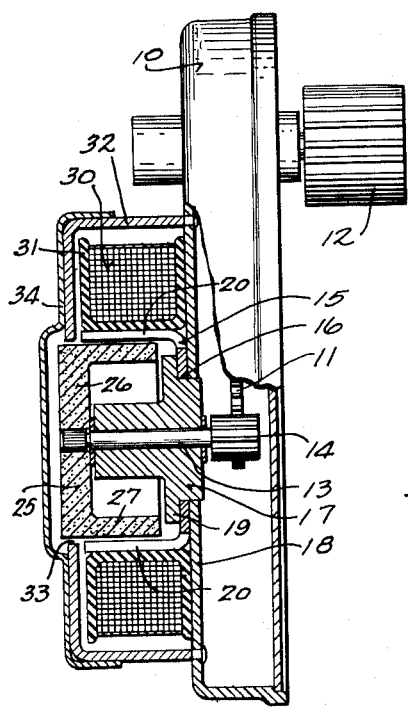
FIGURE 2 is a section on line 2—2 of FIGURE 1.
Figure 1:
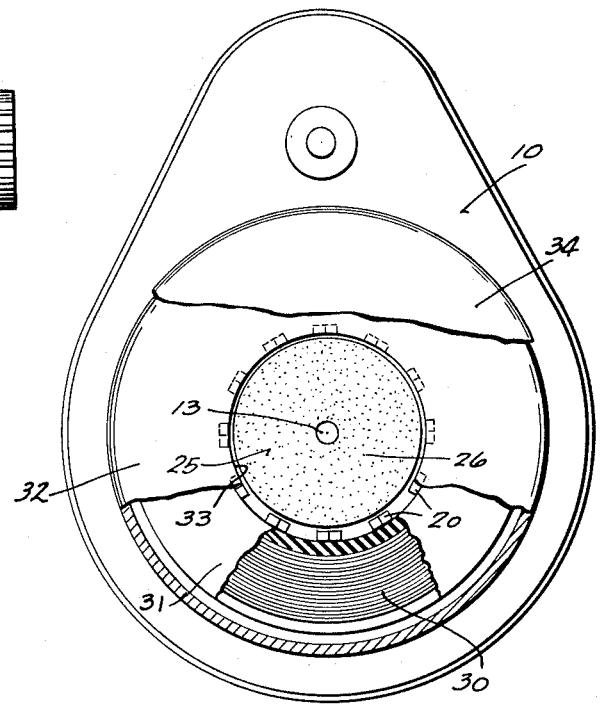
FIGURE 1 is a plan view of a synchronous motor and synchronous motor gear train case and cover embodying this invention, a portion of the motor cover being broken away to show a portion of the motor rotor and a few of the digital pole piece projections, plus a portion of the coil case which in turn is broken away to expose a part of the coil windings.
Figure 4:
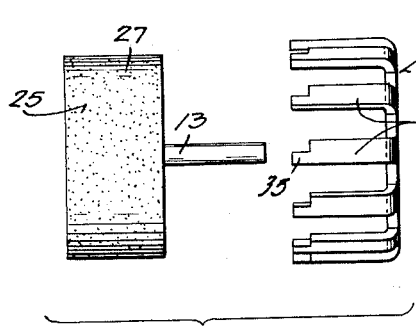
FIGURE 4 is an exploded view of the rotor and rotor shaft, at the left, and basket-like arrangement of the pole piece with notched digital fingers, at the right, of our synchronous motor.

In accord with a somewhat usual practice, this motor is mounted to a gear case 10 housing a train of driven reduction gearing of which I have only shown the first driven gear at 11 and final output gear 12. The motor shaft 13 of my motor is equipped with a driving pinion 14 meshed with gear 11.

The parts of this new motor include a basket-shaped pole piece 15, the bottom of which is open so that the pole piece is receivable upon bearing hub shoulder 16 forming a part of bearing hub 17. It is this same bearing hub which provides the bearing support for rotor shaft 13. The same shoulder 16 fits snugly in an opening in the web-like cover 18 for gear case 10 so that the entire bearing 17 may be staked to the web 18 with the pole piece 15 held tightly and positioned accurately by the bearing 17 and particularly by a flange 19 seen clearly in FIGURE 2. What might be termed the side walls of the basket shape of pole piece 15 comprise the digital pole pieces 20 which have an important part to play in the carrying out of my invention.

The rotor 25 of my motor, mounted as it is upon shaft 13 supported by bearing 17, is cup-shaped. It has a disc-shaped body 26 and an annular flange 27 extending into the basket in such manner that the outer cylindrical shape of the rotor conforms closely but not in contact with the inner surface of the side wall of the pole basket. The rotor is a ceramic element loaded with ferric particles and is jig magnetized in a manner well-known in this art so as to provide an arrangement of permanent magnetic poles in a pattern indicated in FIGURE 3.

An annular coil 30 is arranged in a somewhat doughnut-shaped plastic carrier 31 having an inner annular surface conforming to the exterior surface of the digital pole pieces of the basket, and the functional portions of the motor as described in my copending application, above identified, include as part of the magnetic flux path of coil 30 a motor cover 32. This cover in accord with the instant invention has a circular opening 33 through which the rotor 25 extends slightly as shown in FIGURE 2 so that the margins of the opening 33 are aligned radially with the disc-shaped body 26 of the rotor 25. Then over the entire face of the motor there is a flanged cap 34 to close the opening in cover 32. It has been found that the alignment of the margins of the opening 33 with the rotor as thus described and shown actually reduces end thrust of the rotor and shaft to a minimum.

Figure 3:
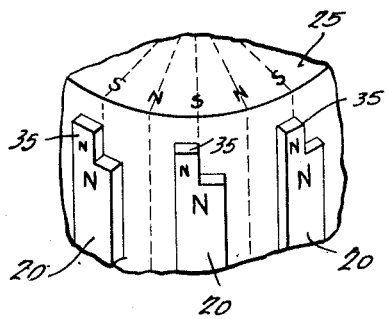
FIGURE 3 is a fragmentary perspective of the rotor and three digital pole piece projections of the motor of our invention.

Particularly referring now to FIGURE 3, the important digital pole pieces 20 are seen to be shaped in accord with this invention so that the extended tips of these pole pieces are notched. When coil 30 is electrically energized by a source of alternating current such as the usual 110 volt 60 cycle A.C. current available so universally, the notched digital pole piece projections assure a positive and reliable start.

Normally, when the coil is deenergized the rotor will stop with adjacent N-S poles straddling a digital pole piece. Thus the rotor would be in a starting position.

However, there is a possibility of the rotor stopping in another position when the coil is deenergized. If there is excessive friction in the rotor bearings, the rotor may stop with a rotor pole lined up directly opposite a field pole so as to be balanced on a so-called knife edge. As can be seen in FIGURE 3, if the digital pole piece is not notched the rotor will then be in a nonstarting position when the coil is energized, since there is equal attraction or repulsion to either side of the field pole. However, in order to provide reliable starting of the rotor even if the rotor should stop on this balance point, a portion of the pole tip has been cut away to leave tip 35. The purpose is not to prevent the rotor from stopping in this position but to get it off of this position when the coil is energized. This is possible since the notched pole tip provides a magnetic unbalance between the quiescent position of the rotor and the starting position. The notched pole tip will not change this balance position of the rotor where the main portion of the field pole is directly opposite the rotor pole, as is shown in FIGURE 3, because the quiescent position of the rotor is determined by flux distribution along the entire length of the rotor and field pole. However, when the coil is energized, the majority of the useful torque producing flux is bridged from the pole tip to the rotor. Therefore, as can be seen in FIGURE 3, the unnotched portion of the pole tip, through which this torque producing flux is bridged, is off center from the rotor pole causing enough unbalance so that when the coil is energized, the rotor will start in a clock-wise direction getting off the balance point and continuing to rotate in a clock-wise direction according to the original theory.

The starting characteristics of this motor with notched pole piece are remarkably prompt and reliable. In addition, the operating characteristics such as output torque are enhanced. This is contrary to the experience where attempts have been made to enhance starting characteristics by irregular spacing of stator poles, or by shading field poles where loss of operating torque has been experienced.

It is now clear that this motor with its reduced end thrust on the rotor and its power output shaft in a combination having a single pole piece with notched digital pole piece projections provides an efficient, positive starting, long lived synchronous motor not heretofore available in this art.

I claim:

1. In a synchronous motor having a permanent magnetized rotor, an alternating current coil for generating a concentrated magnetic flux in a path between the coil and rotor, a magnetically permeable pole piece adjacent said rotor in said path and including a digital pole piece body located immediately adjacent said rotor and positioned to have an end thereof in said concentrated flux path, said pole piece end being notched on one side only with magnetically permeable material removed therefrom.

2. A synchronous motor having a web and cover providing a magnetically permeable frame, said cover having an opening defined by margins; a bearing mounted to the web; a bearing supported permanently magnetized rotor positioned to present the rotor revolubly in said opening; a single pole piece mounted fixedly with respect to the frame and having digital pole piece projections shaped to encompass the rotor in spaced relation; each of said pole piece projections having a free end notched on one side only; and an electrically energizable coil positioned to establish a magnetic flux path including said frame, rotor and pole piece, whereby to float the rotor with minimum thrust.

References Cited in the file of this patent
UNITED STATES PATENTS

| | | |
|---|---|---|
| 2,721,281 | Morganson | Oct. 18, 1955 |
| 2,794,137 | Faus et al. | May 28, 1957 |
| 2,981,855 | Van Lieshout et al. | Apr. 25, 1961 |